United States Patent
Murrell et al.

(10) Patent No.: US 7,182,192 B2
(45) Date of Patent: Feb. 27, 2007

(54) CLUTCH MECHANISM AND METHOD FOR MOVING MEDIA WITHIN AN IMAGE FORMING APPARATUS

(75) Inventors: Niko J. Murrell, Lexington, KY (US); Daniel L. Carter, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 162 days.

(21) Appl. No.: 10/983,402

(22) Filed: Nov. 8, 2004

(65) Prior Publication Data

US 2006/0096826 A1    May 11, 2006

(51) Int. Cl.
    *F16D 41/064*    (2006.01)
(52) U.S. Cl. ............. 192/38; 192/45; 192/89.1
(58) Field of Classification Search ........... 192/89.1; 271/116
    See application file for complete search history.

(56) References Cited

U.S. PATENT DOCUMENTS

| | | | |
|---|---|---|---|
| 90,992 A | 6/1869 | Cardot | |
| 109,299 A | 11/1870 | Goldwell | |
| 116,413 A | 6/1871 | Close | |
| 360,393 A | 3/1887 | Rogers | |
| 1,362,011 A | 12/1920 | Kirby | |
| 1,719,881 A | 7/1929 | Farmer | |
| 2,232,090 A * | 2/1941 | Anderson | 192/45 |
| 3,040,853 A * | 6/1962 | Svendsen | 192/45 |
| 3,503,490 A | 3/1970 | Heyne | |
| 3,606,938 A | 9/1971 | Heyne | |
| 4,320,953 A | 3/1982 | Schultes et al. | |
| 4,411,511 A | 10/1983 | Ariyama et al. | |
| 4,544,294 A | 10/1985 | Runzi | |
| 4,548,316 A | 10/1985 | Maurer | |
| 4,566,684 A | 1/1986 | Gysling | |
| 4,577,849 A | 3/1986 | Watanabe | |
| 4,580,917 A | 4/1986 | Hibino | |
| 4,589,765 A | 5/1986 | Perun et al. | |
| 4,660,821 A | 4/1987 | Boser et al. | |
| 4,682,769 A | 7/1987 | Murakami et al. | |
| 4,744,687 A | 5/1988 | Nukaya et al. | |
| 4,768,463 A | 9/1988 | Yoshida et al. | |
| 4,790,524 A | 12/1988 | Murakami et al. | |
| 4,809,969 A | 3/1989 | Bastow et al. | |
| 4,865,305 A | 9/1989 | Momiyama et al. | |
| 4,868,609 A | 9/1989 | Nagata et al. | |
| 4,884,796 A | 12/1989 | Daboub | |
| 4,900,003 A | 2/1990 | Hashimoto | |
| 4,990,011 A | 2/1991 | Underwood et al. | |
| 5,056,771 A | 10/1991 | Beck et al. | |
| 5,121,914 A | 6/1992 | Hargreaves | |

(Continued)

*Primary Examiner*—Rodney H. Bonck
(74) *Attorney, Agent, or Firm*—Coats & Bennett, PLLC

(57) ABSTRACT

A clutch adapted for use to move media in an image forming apparatus having an independently rotatable first race, an independently rotatable second race, and an open central section within the interior of the first and second races. The clutch has a bearing movable between an engaged position in simultaneously contact with the first and second races to transmit a rotational torque from the first race to the second race and a second disengaged position moveable through the open central section. During torque transmission, the bearing simultaneously engages one of a plurality of spaced-apart fins disposed around the open central section on the first race and one of a plurality of spaced-apart catches on the second race disposed outside of the plurality of fins.

23 Claims, 8 Drawing Sheets

U.S. PATENT DOCUMENTS

| | | |
|---|---|---|
| 5,121,915 A | 6/1992 | Duncan et al. |
| 5,141,217 A | 8/1992 | Lim et al. |
| 5,147,020 A | 9/1992 | Scherman et al. |
| 5,169,136 A | 12/1992 | Yamagata et al. |
| 5,195,737 A | 3/1993 | Ifkovits, Jr. et al. |
| 5,197,726 A | 3/1993 | Nogami |
| 5,253,856 A | 10/1993 | Fuchi et al. |
| 5,277,415 A | 1/1994 | Kinoshita et al. |
| 5,390,773 A | 2/1995 | Proia |
| 5,393,044 A | 2/1995 | Hagihara et al. |
| 5,423,527 A | 6/1995 | Tranquilla |
| 5,428,431 A | 6/1995 | Abe et al. |
| 5,465,955 A | 11/1995 | Krupica et al. |
| 5,495,326 A | 2/1996 | Mikida |
| 5,501,444 A | 3/1996 | Yukimachi et al. |
| 5,507,478 A | 4/1996 | Nottingham et al. |
| 5,547,181 A | 8/1996 | Underwood |
| 5,558,193 A * | 9/1996 | Jenkins et al. ............... 192/45 |
| 5,580,046 A | 12/1996 | Beaufort et al. |
| 5,651,538 A | 7/1997 | Chung et al. |
| 5,667,215 A | 9/1997 | Yoshino |
| 5,692,741 A | 12/1997 | Nakamura et al. |
| 5,826,135 A | 10/1998 | Lee |
| 5,878,321 A | 3/1999 | Miyazaki et al. |
| 5,884,135 A | 3/1999 | Moore |
| 6,076,821 A | 6/2000 | Embry et al. |
| 6,170,816 B1 | 1/2001 | Gillmann et al. |
| 6,293,537 B1 | 9/2001 | Park |
| 6,330,424 B1 | 12/2001 | Chapman et al. |
| 6,382,618 B1 | 5/2002 | Takada |
| 6,390,467 B1 | 5/2002 | Fukube |
| 6,446,954 B1 | 9/2002 | Lim et al. |
| 6,454,069 B2 | 9/2002 | Oh |
| 6,519,443 B1 | 2/2003 | Coriale et al. |
| 6,527,097 B2 | 3/2003 | Dreyer |
| 6,644,452 B2 | 11/2003 | Lew et al. |
| 6,679,490 B2 | 1/2004 | Pioquinto et al. |
| 6,736,389 B2 | 5/2004 | Kosmoski |
| 6,955,252 B2 | 10/2005 | Allport |
| 2005/0092572 A1* | 5/2005 | Kuo ........................... 192/45 |

* cited by examiner

CLUTCH MECHANISM AND METHOD FOR MOVING MEDIA WITHIN AN IMAGE FORMING APPARATUS

BACKGROUND

Many types of image forming devices pick a media sheet from a storage location and move the media sheet to an imaging location for receipt of an ink or toner image. The pick mechanism contacts the media sheet at the input tray and transports the sheet a distance where it is introduced to and driven by rollers, belts, or other transport devices in the media path. At the introduction point into the media path, the media sheet may still be in contact with the pick mechanism. The pick mechanism may impede the movement of the sheet into the media path. The resulting drag created by the pick mechanism may result in timing errors during the image formation process or may cause media skew. In either case, the unwanted drag created by the pick mechanism may cause registration errors affecting the image location on the media sheet.

To alleviate this problem, image forming devices sometimes use a bearing-clutch design for picking media sheets from an input tray. One example of a bearing-clutch is disclosed in U.S. patent application Ser. No. 10/436,406 assigned to Lexmark, International, Inc. and hereby incorporated by reference herein in its entirety. A bearing-clutch reduces or prevents drag on a media sheet that is in friction contact with two separate sections of the media path.

The bearing clutch should reduce or eliminate drag acting on the media sheet that may cause errors as the media sheet is forwarded to the downstream media moving mechanism. The mechanism should also be responsive to the controls of the drive source to provide for accurate movement of the media sheet.

SUMMARY

An embodiment of the present invention is directed to a clutch mechanism applicable in a sheet conveyance system for an image forming device. The embodiment includes a first race having an interior wall forming an open recess. A plurality of detents are spaced around the interior wall with each detent having a ramped section leading into a catch. The clutch also includes a second race having a plurality of fins, each fin spaced away from an open central section of the second race. The second race is rotatably mounted relative to the first race with the fins being disposed inside of the inner wall during rotation. A bearing is positioned between the first and second races. The bearing is sized to simultaneously contact one of the catches and one of the fins to transmit a rotational torque from the second race to the first race. The bearing may have a variety of shapes, including spherical and cylindrical.

The open central section may be large enough to allow the bearing to pass. In one embodiment, the plurality of fins and interior wall extend outwardly from a ramped surface that slopes downward from a high point near the open central section to a low point adjacent the interior wall. In another embodiment, the plurality of fins and interior wall extend outwardly from a substantially flat surface that is substantially perpendicular to the central axis of clutch rotation.

During operation, the bearing may be movable between an engaged position in simultaneous contact with the first and second races to transmit the rotational torque and a second disengaged position moving through the open central section. The clutch may be oriented in various positions, including with a vertical or horizontal axis of rotation. In one embodiment where the axis of rotation is non-vertical, the bearing falls under its own weight to a low point in the clutch. In another embodiment where the axis of rotation is substantially vertical, the bearing is guided by gravity by a ramped surface toward the inner wall of the first race.

The space between adjacent fins may be larger than a width of the bearing to allow the bearing to pass into the open central section when the bearing is disengaged. The bearing disengages from between the first race and the second race when the first race rotates at a faster rate than the second race. The bearing re-engages between the first race and a second race when the second race rotates at a faster rate of rotational velocity than the first race.

DETAILED DESCRIPTION

Figure 1:
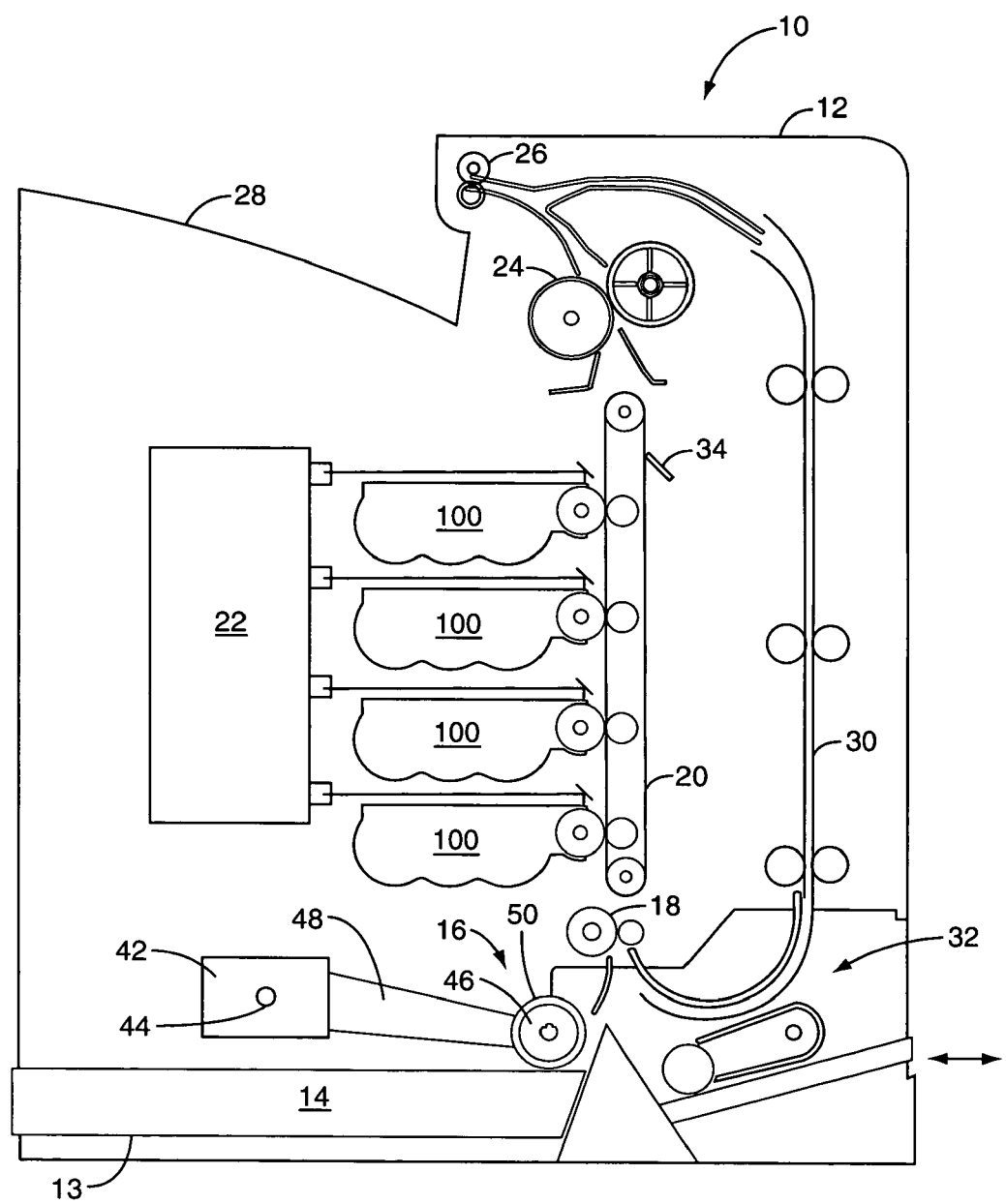
FIG. 1 is a functional block diagram of an image forming apparatus according to one embodiment of the present invention.

The present invention is directed to a clutch mechanism adapted for use in moving media sheets in an image forming apparatus. One application of the clutch mechanism is for moving media sheets from an input tray into an image forming path within an image forming apparatus as generally illustrated in FIG. 1. FIG. 1 depicts a representative image forming apparatus, such as a printer, indicated generally by the numeral 10. The image forming apparatus 10 comprises a main body 12, at least one media tray 13 holding a stack of print media 14, a pick mechanism 16, a registration roller 18, a media transport belt 20, a printhead 22, a plurality of image forming stations 100, a fuser roller 24, exit rollers 26, an output tray 28, and a duplex path 30 and a cleaner 34.

The media tray 13, disposed in a lower portion of the main body 12, contains a stack of print media 14 on which images are to be formed. The media tray 13 is preferably removable for refilling. Pick mechanism 16 picks up media sheets from the top of the media stack 14 in the media tray 13 and feeds the print media into a primary media path. Registration roller 18, disposed along a media path, aligns the print media and precisely controls its further movement along the media path. Media transport belt 20 transports the print media along the media path past a series of image forming stations 100, which apply toner images to the print media. Color printers typically include four image forming stations 100 for printing with cyan, magenta, yellow, and black toner to produce a four-color image on the media sheet. The media transport belt 20 conveys the print media with the color image thereon to the fuser roller 24, which fixes the color image on the print media. A cleaner assembly 34 removes residual toner remaining on the media transport belt 20 after the print media is passed on to the fuser roller 24. Exit rollers 26 either eject the print media to the output tray 28, or direct it into a duplex path 30 for printing on a second side of the print media. In the latter case, the exit rollers 26 partially eject the print media and then reverse direction to invert the print media and direct it into the duplex path. A series of rollers in the duplex path 30 return the inverted print media to the primary media path for printing on the second side. The image forming apparatus 10 may further include an auxiliary feed 32 to manually feed media sheets.

In one embodiment, the pick mechanism 16 is movably mounted in the image forming apparatus 10. In the particular embodiment shown in FIG. 1, the pick mechanism 16 is pivotally mounted to support structure 42 and pivots about axle 44. A free end of the pick mechanism 16 includes at least one pick roller 46 that contacts a top sheet of the media stack 14. In other embodiments, the pick mechanism 16 may be fixedly mounted or mounted with limited movement within the image forming apparatus 10. Accordingly, the media tray 13 in these embodiments moves or pivots to keep an uppermost sheet of the media stack 14 in contact with the pick roller 46.

The pick roller 46 includes a friction surface, sometimes referred to as a pick tire 50. The pick roller 46 rotates to move the uppermost sheet in the media stack 14 toward registration rollers 18. The rotational force is supplied to the pick roller 46 through gears, belts, a motor, and/or other drive train components (not shown) located in support arm 48. The registration rollers 18 align the leading edge of the media sheet and begin rotating at the appropriate time to transport the media sheet to transport belt 20 and to the sequence of image forming stations 100. At the point when the registration rollers 18 begin to pull the media sheet from the pick roller 46, the pick roller 46 may be stopped or rotating at a rate that is slower than the rate at which the media sheet moves through the imaging path. The transport belt 20, registration rollers 18, and pick roller 46 all have frictional surfaces that may simultaneously be in contact with the media sheet. Consequently, opposing friction forces may be created between the registration rollers 18, transport belt 20, and the pick roller 46. The clutch mechanism of the present invention alleviates this problem by permitting the pick roller 46 to freewheel in the direction of media travel independent of the drive mechanism that rotates the pick roller 46.

Figure 2:
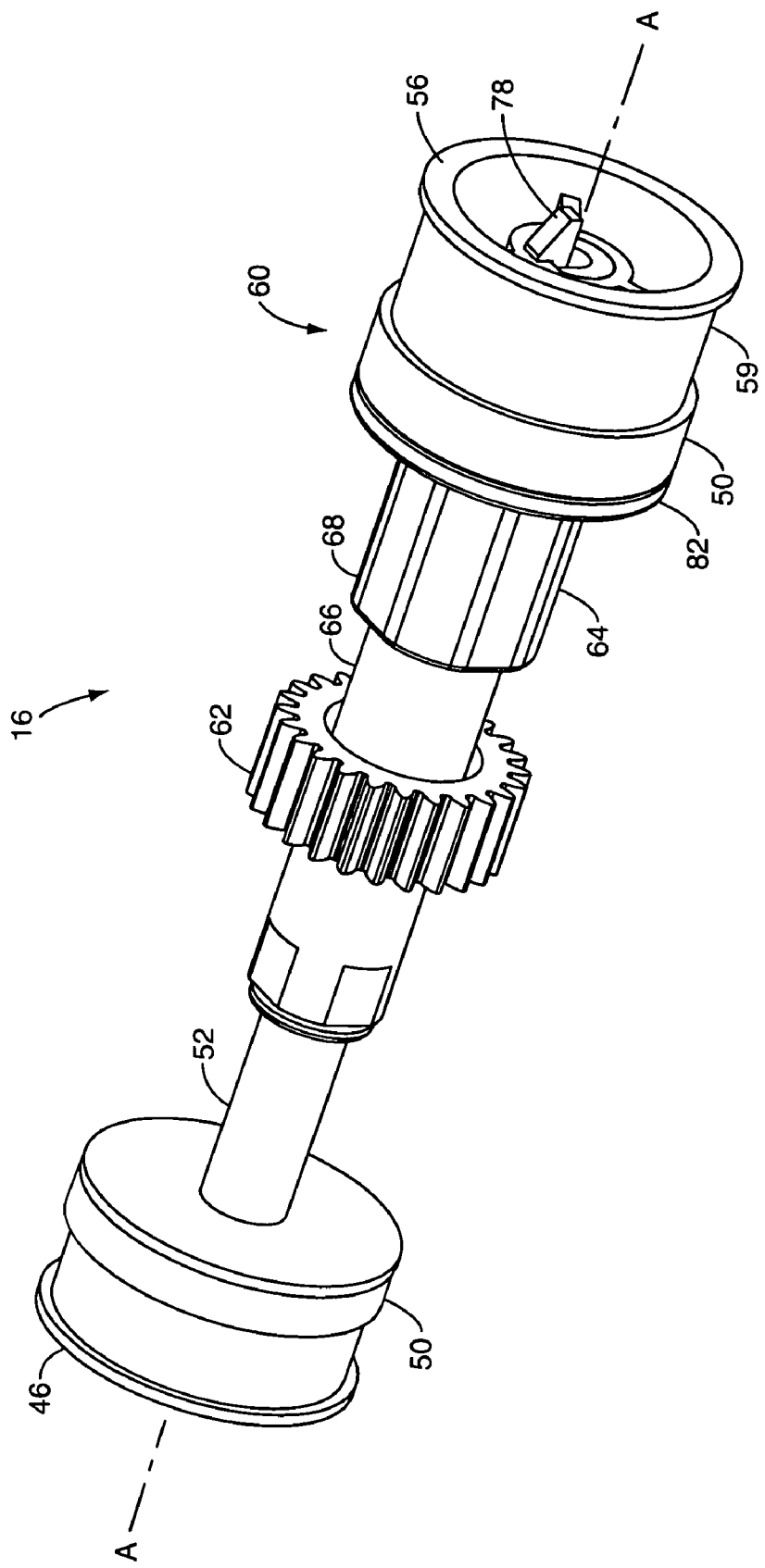
FIG. 2 is a partial perspective view illustrating one embodiment of a pick mechanism according to the present invention.
Figure 3:
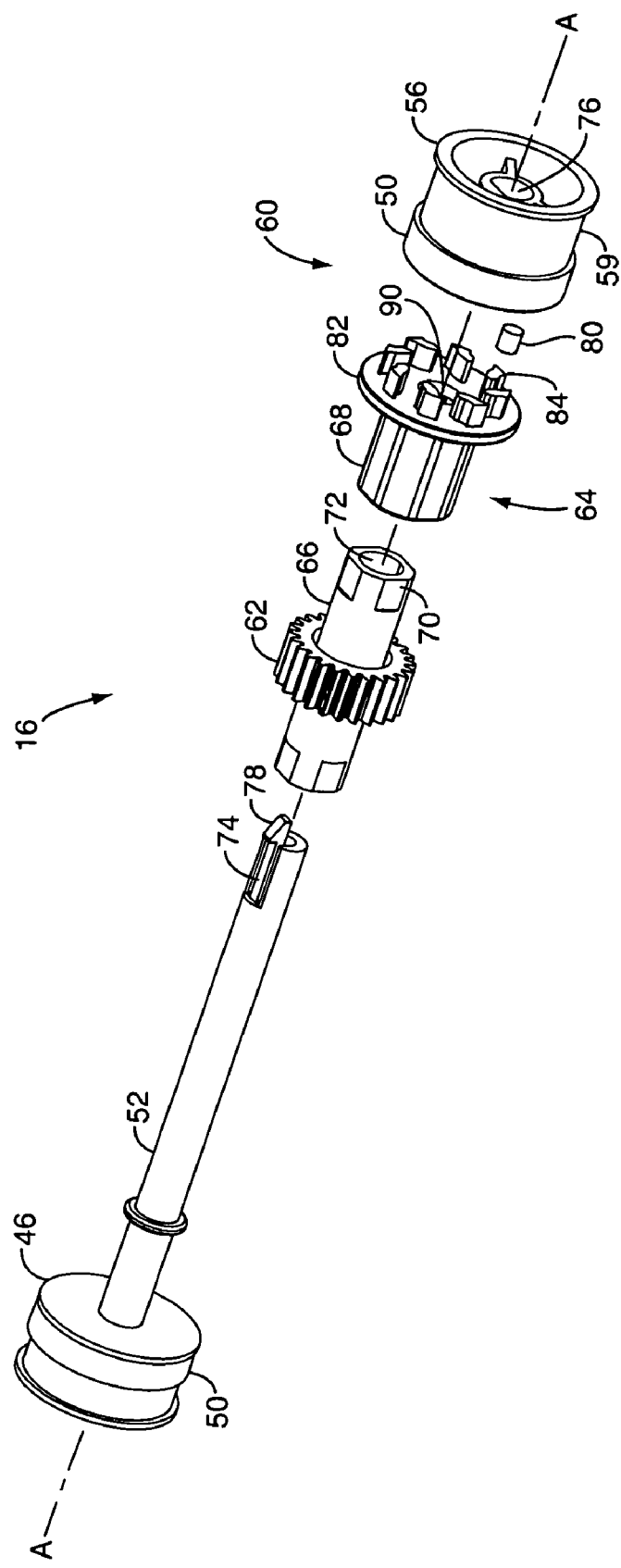
FIG. 3 is an exploded partial perspective view illustrating one embodiment of a pick mechanism according to the present invention.
Figure 4:
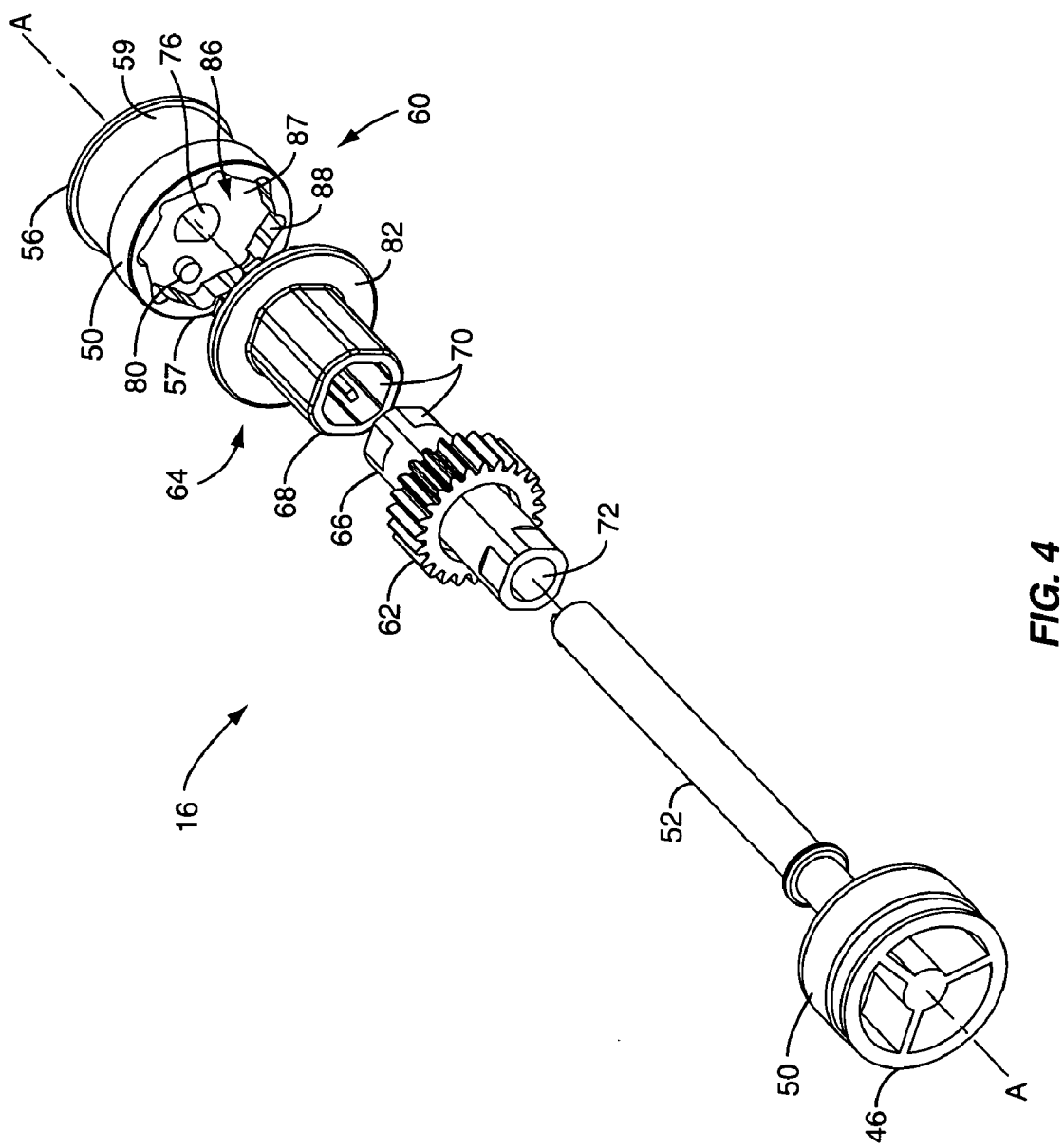
FIG. 4 is an exploded partial perspective view illustrating one embodiment of a pick mechanism according to the present invention.

FIG. 2 illustrates one embodiment of the pick mechanism 16. An exploded view of the same embodiment of the pick mechanism 16 is shown in FIG. 3. FIG. 4 shows a reverse-angle exploded view of this same embodiment. The pick mechanism 16 includes an input drive gear 62 that is rotated by a toothed belt or other gears (not shown) disposed in the support arm 48 shown in FIG. 1. The input drive gear 62 is rotated as needed by the image forming apparatus 10 to feed new media sheets from the input tray 13 to the image path.

The input drive gear 62 is coupled to the inner race 64 of a clutch mechanism 60. In the embodiment shown in FIGS. 2–4, the drive gear 62 has an axially extending drive shaft 66 that fits within a collar 68 on the inner race 64. The drive shaft 66 and collar 68 feature mating geometry that allows the drive shaft 66 to transmit a rotational force from the input drive gear 62 to the inner race 64. In the embodiment shown in the Figures, this mating geometry is a square shape, with four flats 70 on each part that allow the drive shaft 66 to rotate the inner race 64. Other geometries are possible, including for example, a spline configuration, a D-shape configuration, a key-slot configuration, and others known by those skilled in the art.

The input rotational force that is transmitted to the inner race 64 is further transmitted to a clutch roller 56 by the clutch mechanism 60. The particular workings of the clutch 60 are discussed in greater detail below. It will suffice to say for now that the inner race 64 transmits the rotational force from the input gear 62 to the clutch roller 56 through a bearing 80 located within the clutch mechanism 60. In the embodiment shown in FIGS. 2–4, the clutch roller 56 simultaneously functions as an outer race 57 (best seen in FIG. 4) of the clutch mechanism 60 and a pick roller 59 on which a pick tire 50 is mounted. In other embodiments, the clutch mechanism 60 may be separated from the pick roller 59. The pick tire 50 is a resilient member that is secured around the perimeter of the clutch roller 56 and provides frictional forces that allow the clutch roller 56 to move media sheets within the image forming apparatus 10.

A pick roller 46 with a substantially similar pick tire 50 is coupled to the end of a slave shaft 52. The slave shaft 52 has a smaller cross section than the gear drive shaft 66. Specifically, the slave shaft 52 has a cross section small enough to fit within a central aperture 72 that runs axially through the input drive gear 62 and drive shaft 66. The slave shaft 52 is also insertable through an aperture 90 in the inner race 64 and a D-shaped aperture 76 in the clutch roller 56. The end of the slave shaft 52 opposite pick roller 46 features a geometry that allows the clutch roller 56 to transmit a rotational force from the clutch mechanism 60 to the pick roller 46. In the embodiment shown in the Figures, this mating geometry is a D-shape. That is, the end of the slave shaft 52 has a D-shaped cross section 74 that mates with the corresponding D-shaped aperture 76 in the clutch roller 56. Other geometries are possible, including for example, a spline configuration, a square configuration, a key-slot configuration, and others known by those skilled in the art. In any event, the clutch roller 56 and pick roller 46 may be coupled together so they can evenly apply friction forces through tires 50 to transfer media sheets within the image forming apparatus 10 without inducing unnecessary skew.

In addition to the D-shape drive feature 74, the slave shaft 52 further comprises a resilient locking tab 78 that deflects inward as the slave shaft 52 is inserted through the central aperture 72, aperture 90, and D-shaped aperture 76. Once the locking tab 78 exits the far side of the D-shaped aperture 76 as shown in FIG. 2, the locking tab 78 deflects back to an original position to hold the pick mechanism assembly 16 together. While a single locking tab 78 is shown in the Figures, it is possible to use multiple locking tabs 78 to further retain the parts of the pick mechanism 16.

To summarize, the pick mechanism 16 operates in the following manner. An input rotational force is applied to the input drive gear 62 from a drive source (not shown) located within the image forming apparatus 10. The input drive shaft 66 rotates with the input drive gear 62 and transmits this rotational force to the collar 68 of inner race 64. The inner race 64 then directly transmits the rotational force to clutch roller 56 through the clutch mechanism 60. Since the second pick roller 46 is coupled to the clutch roller through the slave shaft 52, the inner race 64 also indirectly transmits the rotational force to pick roller 46. Media sheets are then conveyed within the image forming apparatus 10 by friction forces imparted by the pick tires 50 mounted on rollers 46, 56. In this configuration, the clutch mechanism 60 is able to simultaneously impart a rotational force to two rollers 46, 56.

The pick mechanism 16 shown in FIGS. 2–4 represents one of a variety of possible embodiments. Other configurations incorporating the clutch mechanism 60 disclosed herein can be constructed to fit the requirements of a particular sheet moving application. For example, in one embodiment, the clutch mechanism 60 drives a single roller 46 or 56, in which case, the slave shaft 52 and central apertures 72, 90, and 76 are unnecessary. In another embodiment, pick roller 46 may be positioned on the opposite side of the clutch mechanism 60, also making the central apertures 72, 76, 90 unnecessary. Other embodiments are certainly possible as those skilled in the art will comprehend.

One embodiment of the clutch mechanism 60 will now be described. The inner race 64 includes the aforementioned collar 68 and a substantially disc-shaped flange portion 82 disposed at one end of the collar 68. The flange 82 is oriented substantially perpendicular to the pick mechanism 16 axis of rotation A. The flange 82 includes a plurality of fins 84, visible in FIG. 3, that protrude from the flange 82 in a direction parallel to the axis of rotation A. The plurality of fins 84 are disposed generally in a circular pattern spaced away from the center of the inner race 64. When assembled, the fins 84 reside within a recess 86 in the outer race 57 of clutch roller 56, best seen in FIG. 4. The recess 86 in the clutch roller 56 is bounded around its perimeter by an interior wall 88. In addition, a bearing 80 is inserted between the inner race 64 and the clutch roller 56. The bearing 80 is retained within a substantially cylindrical volume that is bounded around the perimeter by interior wall 88 and on the sides by flange 82 and the bottom 87 of recess 86.

The bearing 80 may have a variety of different shapes. Some non-limiting examples include a spherical bearing or a cylindrical bearing as shown in FIGS. 3 and 4. A cylindrical bearing 80 may advantageously provide improved load transfer characteristics in transmitting torque from the inner race 64 to the outer race 57. A cylindrical bearing 80 should be installed with the cylinder axis aligned with the clutch mechanism 60 axis of rotation A. The length of the cylindrical bearing 80 is roughly on the same order of magnitude as fins 84. The length of the cylindrical bearing 80 should not be so large as to create simultaneous interference with surfaces 82 and 87 of the inner 64 and outer 57 races, respectively. By the same token, the length of a cylindrical bearing should not be so small as to allow the bearing 80 to tumble within the clutch mechanism 60, thereby falling out of alignment with axis of rotation A.

Figure 5:
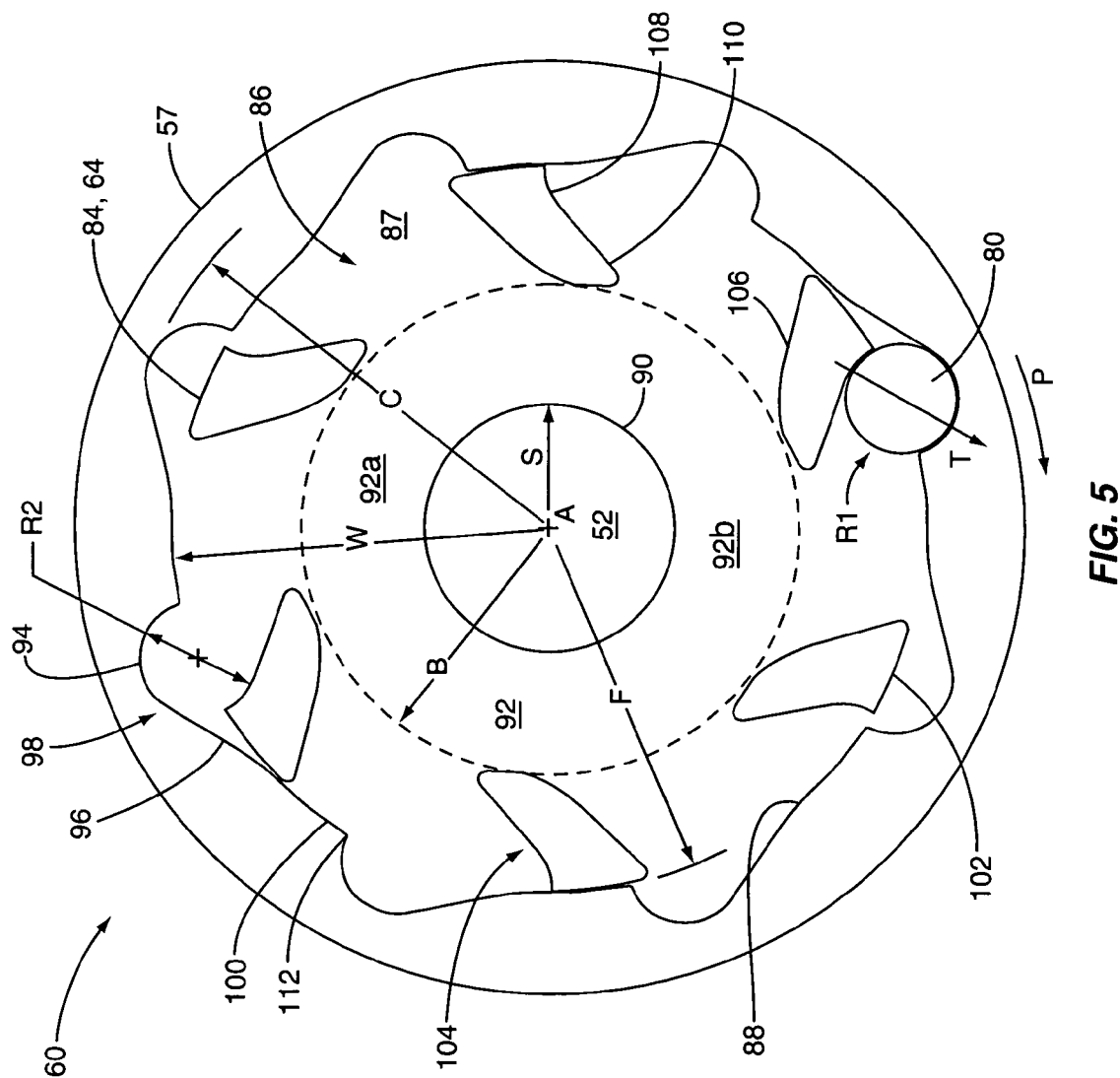
FIG. 5 is a schematic view illustrating one embodiment of a clutch mechanism according to the present invention.

A more detailed view of the internal geometry of the clutch mechanism 60 is shown in FIG. 5. The bottom 87 of recess 86 and interior wall 88 are part of the outer race 57 of the clutch mechanism 60. The plurality of fins 84 are part of the inner race 64. The plurality of fins 84 are disposed in a generally circular pattern spaced away from the center of rotation (designated axis A in FIG. 5) a minimum distance B. The fin spacing creates an open central section 92.

In the dual roller embodiment shown in FIGS. 2–4, a slave shaft 52 is inserted through the central aperture 90 in the inner race 64. In other embodiments, the inner race may not include the central aperture 90. In embodiments where a central aperture 90 and shaft 52 are included, it is desirable to make the difference between distance B and the radius S of the shaft 52 greater than the width of the bearing 80. The bearing 80 may be embodied in a variety of different shapes, including for example a sphere or a cylinder, where the width of the bearing is simply its diameter or twice the radius R1. In embodiments where there is no central aperture 90 or shaft 52, it is desirable to make distance B larger than the width of the bearing 80. In each case, the size of the open central section 92 permits bearing 80 to pass through the open central section 92. Once bearing 80 passes into the open central section 92, the bearing 80 generally falls under the influence of gravity from an upper portion 92a to a lower portion 92b of the open central section 92. Also, the bearing 80 ultimately tends to fall out of the open central section 92 and into a low point in a space between two adjacent fins 84 and in contact with inner wall 88 similar to the position shown in FIG. 5. A more thorough example of the movement of bearing 80 within the clutch mechanism 60 is shown in FIGS. 6A–6F and is discussed in greater detail below.

The interior wall 88 is nominally spaced a minimum distance W from the axis of rotation A. A plurality of indentations 98 are formed in the interior wall 88. The embodiment shown in FIG. 5 has a total of eight (8) indentations 98 though other quantities are possible. Each indentation 98 is characterized by a catch 94 and a ramped section 96. An intermediate section 100 having a substantially constant radius may be located on the interior wall 88 between each indentation 98. In other embodiments, the ramped section 96 may extended to an adjacent catch 94. In other words, the interior wall 88 may be comprised of a series of indentations 98 with no intermediate sections 100. In either case, the intermediate section 100 or the ramped section 96 is positioned a distance W from the axis of rotation A.

The catch 94 is positioned outside of distance W, with a maximum indentation occurring at a dimension C. The catch 94 may adjoin an intermediate section 100 or an adjacent ramped section 96 at a location 112 near dimension W, but the majority of the catch 94 is positioned outside of dimension W. The difference between dimensions C and W should be less than the width of the bearing 80. In one embodiment, the difference between dimensions C and W is less than about half the width of the bearing 80. The ramped section 96 traverses a substantially linear path between intermediate section 100 of interior wall 88 and the catch 94. Alternatively, the ramped section 96 may traverse a non-linear path, such as a curved or sloping path. Also, if there is no intermediate section 100 between adjacent catches 94, the ramped section 96 may traverse a linear or non-linear path from the end of one catch 94, at a location 112 near dimension W, to the adjacent catch 94 at some point having a dimension from axis A greater than W.

The plurality of fins 84 of the inner race 64 are disposed inside of the interior wall 88 of the outer race. The embodiment shown in FIG. 5 has a total of six (6) fins 84 though other quantities are possible. Notably, the plurality of fins 84 have an outer edge 102 that faces away from the axis of rotation A and towards the interior wall 88. The outer edge 102 is spaced away from the axis of rotation A by distance F that is less than dimension W associated with interior wall 88. In one embodiment, the outer edge 102 has a substantially constant-radius F centered about axis A. The difference between dimension W and dimension F should be less than the width of bearing 80. Also, the difference between dimension W and dimension C should also be less than the width of bearing 80.

The plurality of fins 84 also have a leading edge 104 and trailing edge 106. The leading edge 104 has two sections: bearing surface 108 and guide surface 110. As shown at the bottom of FIG. 5, bearing surface 108 is configured to contact bearing 80 at certain times during clutch 60 operation. By comparison, guide surface 110 is shown in FIG. 5 out of contact with bearing 80, but is in fact configured to contact bearing 80 at other times during clutch 60 operation. The fins 84 are generally raked to lean in the direction of rotation P. The bearing surface 108 and guide surface 110 cooperate to engage and secure the bearing 80 against the catch 94 as shown in FIGS. 5, 6A and 6B. The trailing edge 106 defines the thickness of the individual fins 84 and is configured to provide sufficient strength to each fin 84. However, the trailing edge 106 should also be constructed so that there is sufficient space between adjacent fins 84 to allow bearing 80 to pass to and from the open central section 92. Also, the trailing edge 106 should be constructed so that it does not lock the bearing 80 between the inner 64 and outer 57 races if the inner race 64 rotates in a direction opposite to direction N shown in FIGS. 6A–6F. Thus, the trailing edge 106 and ramped section 96 cooperate to direct the bearing 80 out of a catch 94 and into the open central section 92 if the inner race 64 rotates in a direction opposite to direction N shown in FIGS. 6A–6F. Accordingly, the design of the clutch mechanism 60 may advantageously allow the inner race 64 to drive the outer race 57 when rotated in one direction yet not rotate the outer race 57 when rotated in the opposite direction.

The clutch mechanism 60 shown in FIG. 5 represents one particular instant in normal operation when the inner race 64 is transmitting a rotational force, represented by force vector T, through bearing 80 and to the outer race 57 to rotate the outer race 57 in the direction indicated by arrow P. The bearing 80 is simultaneously in contact with the bearing surface 108 of one of the fins 84 and one of the catches 94. The clutch mechanism 60 is configured so that the bearing 80 may similarly be in contact with any of the plurality of fins 84 and any of the plurality of catches 94.

In one embodiment, the bearing surface 108 and catch 94 are advantageously curved with a radius R2 that is substantially similar to the width of bearing 80. As alluded to above, bearing 80 can have a variety of shapes, including spherical and cylindrical shapes, the size of which are definable by a radius R1. Thus, bearing surface 108 and catch 94 may be curved with a radius R2 that substantially matches the radius R1 of bearing 80. By having a shape that substantially matches bearing 80, the force vector T can potentially be distributed over a greater contact area.

In one embodiment of the clutch mechanism 60, the values for the dimensions shown in FIG. 5 are approximately as follows:

| Dimension | Approximate size in millimeters |
| --- | --- |
| R1 | 2.8 |
| R2 | 3.0 |
| B | 6.9 |
| C | 11.8 |
| F | 10.3 |
| W | 10.3 |
| S | 3.6 |

FIGS. 6A–6F illustrate the operation of the inner 64 and outer 57 races and bearing 80 of the clutch mechanism 60. The various illustrations of the clutch mechanism 60 shown in FIGS. 6A–6F represent a time sequence beginning at FIG. 6A and progressing forward in time to FIG. 6F. At FIG. 6A, torque is being transferred from the inner race 64 via fin 84 to one of the plurality of catches 94 in the outer race 57 through the bearing 80. At FIG. 6B, the outer race 57 is driven in direction P by rotation of the inner race 64 in direction N to some undetermined position. The sequence from FIG. 6A to FIG. 6B may occur as a media sheet is fed into an image path by pick mechanism 16 in an image forming apparatus 10 as shown in FIG. 1. After the media sheet is fed into the image path a predetermined amount, the media sheet is contacted by rolls 18 (see FIG. 1) positioned downstream of the pick mechanism 16. The downstream rolls 18 advance the media sheet toward the image path at a faster speed than the pick mechanism 16. However, because the outer race 57 is still in contact with the media sheet, the speed differential causes the outer race 57 to rotate faster than the inner race 64, which may even stop rotating at this point. The outer race 57 continues to rotate because of the contact with the media sheet until the trailing edge of the media sheet is pulled beyond the pick mechanism.

Figure 6C:
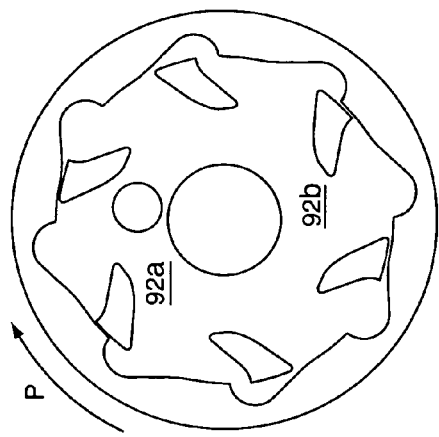
FIGS. 6A–6F schematically illustrate a sequence of positions during operation of one embodiment of a clutch mechanism according to the present invention.
Figure 6F:
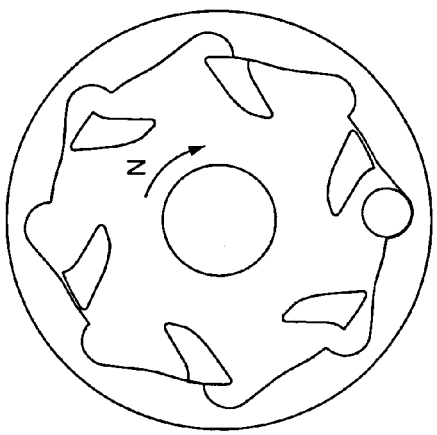
Figure 6B:
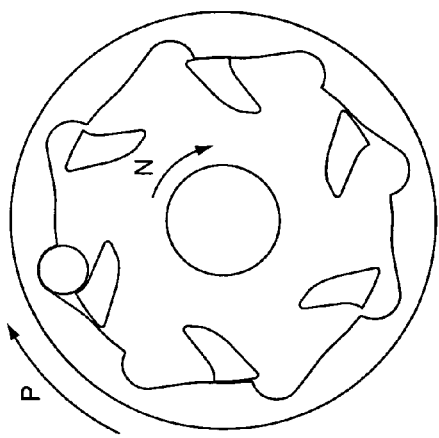
Figure 6E:
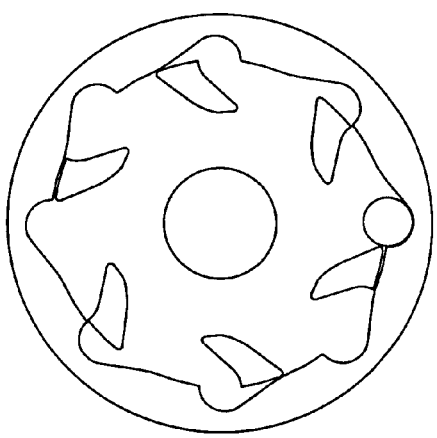
Figure 6A:
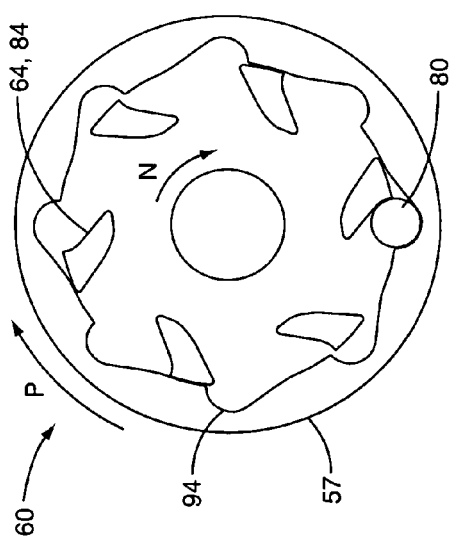
Figure 6D:
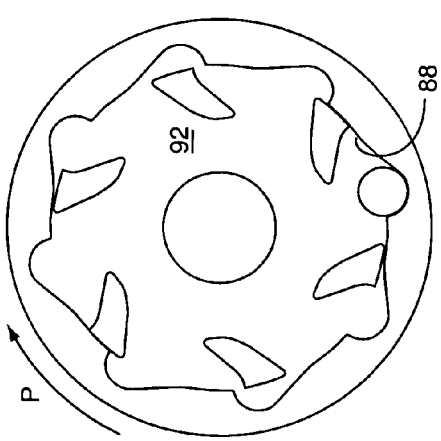

As shown in FIGS. 6C and 6D, freewheeling or faster rotation of the outer race 57 relative to the inner race 64 causes the bearing 80 to move out of simultaneous engagement with the inner 64 and outer 57 races. The configuration of the fins 84 and indentations 98 guide the bearing into the open central section 92 and prevent the bearing 80 from being caught between the races 57, 64 thus allowing the outer race 57 to continue rotating freely. In FIG. 6C, the bearing 80 begins to fall via gravity through the open central section 92 from the upper portion 92a to a lower portion 92b. Ultimately, the bearing falls to a low point in the clutch mechanism 60 between two adjacent fins 84 and in contact with inner surface 88. If the inner race 64 is stationary, the bearing 80 will remain in this general position, deflected only by the movement of the outer race 57 in contact with the bearing 80 from below. In certain instances, bearing 80 may move along trailing edge 106 and over fin 84 into an adjacent space between fins 84. However, if the inner race 64 is still rotating, albeit at a slower rate than the outer race 57, the bearing 80 may be carried by fins 84 up towards the upper portion of the clutch 60 and once again fall through the open central section 92 to a low point in the clutch 60. The process may repeat until the outer race 57 stops rotating (which may occur when the trailing edge of a media sheet in the image forming apparatus 10 passes beyond the pick mechanism 16).

At FIG. 6E, both the inner 64 and outer 57 races are motionless and the bearing 80 falls and remains at a low point in clutch 60 between two adjacent fins 84 in contact with inner surface 88. FIG. 6F shows the cycle beginning again for the next media sheet in the image forming apparatus 10 as the inner clutch 64 rotates in direction N and engages the bearing 80 and outer clutch 57.

The embodiments of the clutch mechanism 60 heretofore described have contemplated a non-vertical axis of rotation. That is not to say that this particular clutch mechanism 60 is strictly limited to a perfectly horizontal axis of rotation as shown in FIGS. 1–6. Since the bearing 80 moves through the open central section 92 of the clutch mechanism 60 towards a low point under the influence of gravity, the clutch mechanism 60 will operate even where the inner 64 and outer 57 races rotate about a non-horizontal axis. Therefore, the embodiments of the clutch mechanism 60 disclosed above will function over a broad range of orientations, including where the pick mechanism 16 axis of rotation approaches a vertical orientation. For applications with a large departure from a horizontal axis of rotation, it may be desirable to implement a spherical bearing 80 to take advantage of the characteristic of a ball to naturally move to a low point in the clutch mechanism 60.

Figure 7:
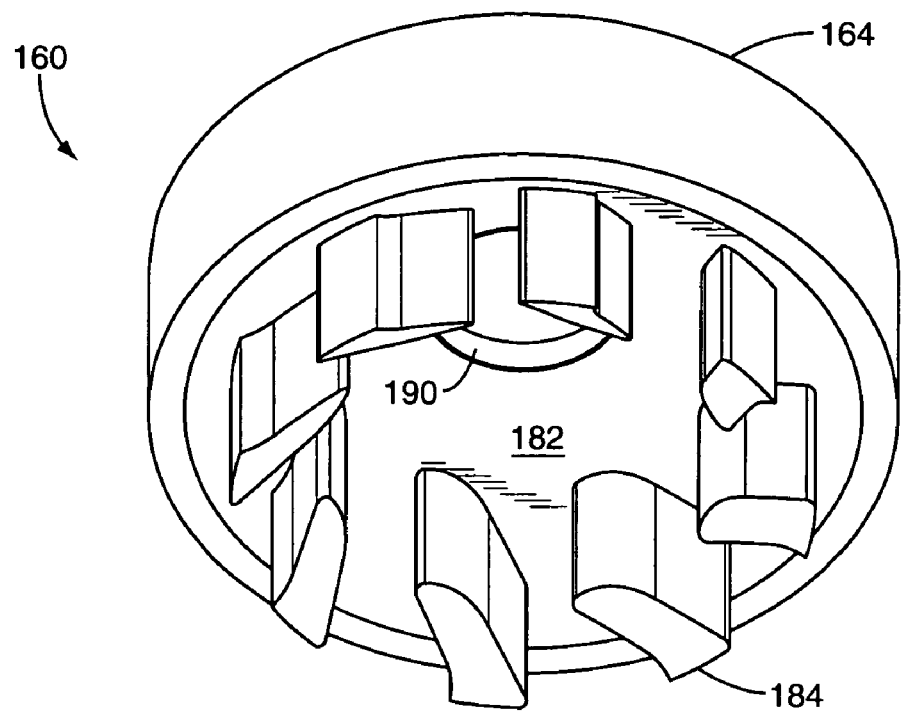
FIG. 7 is a perspective view illustrating an inner and outer race of one embodiment of a clutch mechanism according to the present invention.
Figure 7:
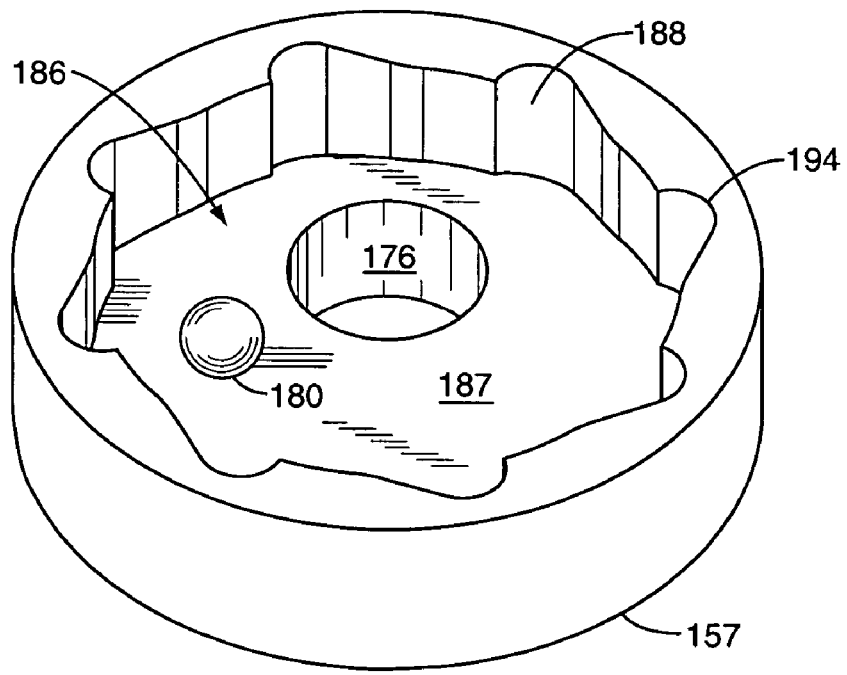

In some cases, it may be desirable to have a clutch mechanism of the type disclosed herein that operates while oriented with a vertical or near-vertical axis of rotation. For instance, a torque transfer mechanism (not shown) requiring a freewheeling clutch mechanism may be vertically oriented within an image forming apparatus. Also, a media tray or an option tray (also not shown) may be mounted vertically within an image forming apparatus or other sheet dispensing apparatus. In each case, the clutch mechanism may be oriented to rotate in a near horizontal plane about a near vertical axis. An alternative embodiment of the clutch mechanism 160 shown in FIG. 7 is adapted for such use.

Similar to clutch mechanism 60, clutch mechanism 160 includes an inner race 164 and an outer race 157. The inner race 164 includes a plurality of fins 184, each constructed similar to those in the above described embodiments. Similarly, the outer race 164 includes a plurality of catches 194 in interior wall 188, each also constructed similar to the above described embodiments. When assembled, the fins 184 are positioned within a recess 186 in the outer race. In one embodiment, the inner 164 and outer 157 races each include central through holes 190 and 176, respectively, for insertion of a drive shaft (not shown in FIG. 7, but similar to shaft 52 described above). One difference between the clutch mechanism 160 and clutch mechanism 60 is that the bottom 187 of recess 186 and the surface 182 from which the plurality of fins 184 protrude are not flat. Surfaces 182 and 187 are ramped, with inner portions (i.e., closer to the axis of rotation A) of each surface higher than the outer portions. In one embodiment, surfaces 182, 187 are conical as best seen in the section view provided in FIG. 8.

Clutch mechanism 160 operates using generally the same principles described above for clutch mechanism 60. Particularly, the clutch mechanism 160 uses a bearing 180 that is simultaneously engageable with one of the plurality of fins 184 and one of the catches 194. In one embodiment, the bearing 180 is substantially spherical. In the engaged position, the inner race 164 transfers rotational torque through the bearing 180 to rotate the outer race 157 in the same direction. The outer race 157 can freewheel about the inner race 164 as needed, at which point the bearing 180 becomes disengaged and is free to move within an open central section 192. Also similar to clutch 60, the bearing 180 in clutch 160 moves to a low point on ramped surface 187 until the inner race 164 once again rotates faster than the outer race to engage the bearing 180 between the races 157, 164.

Figure 8:
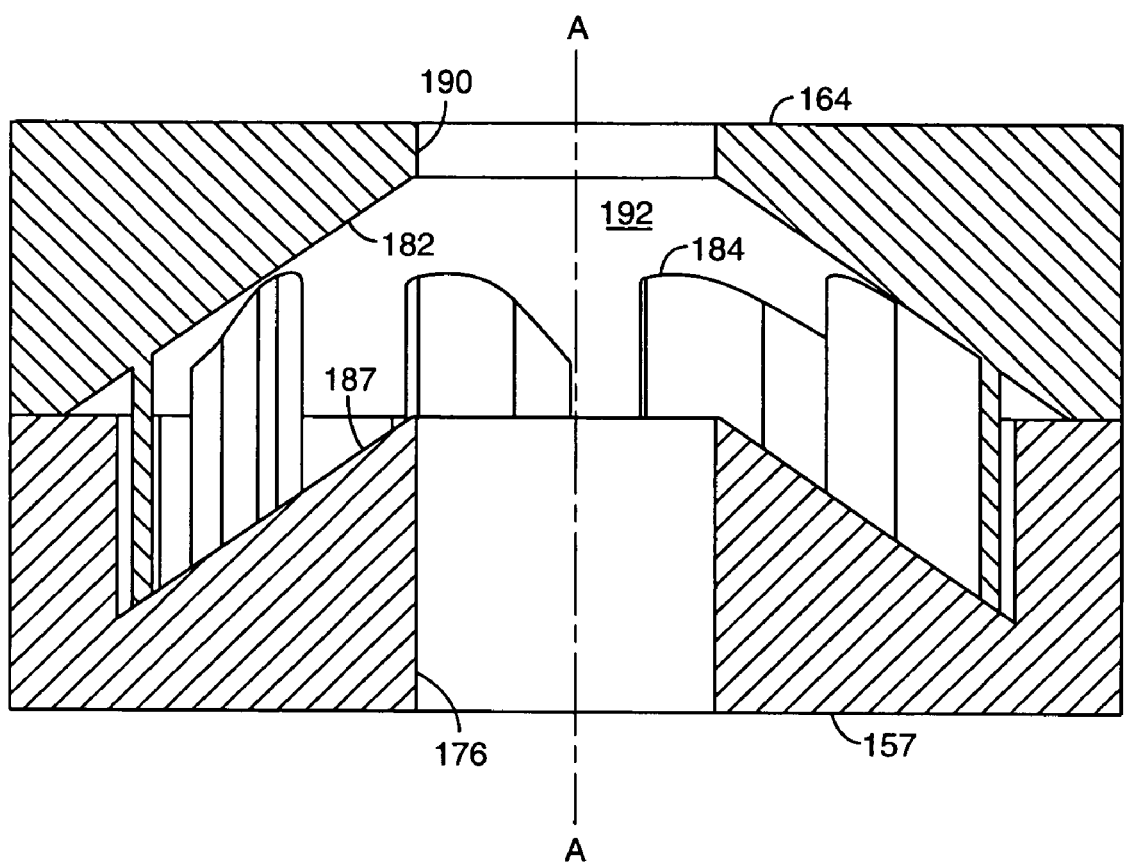
FIG. 8 is a section view illustrating an inner and outer race of one embodiment of a clutch mechanism according to the present invention.

Clutch mechanism 160 may operate in a substantially vertical orientation as shown in FIG. 8. Alternatively, clutch mechanism 160 may be oriented with a range of non-vertical axes of rotation A provided the bearing 180 can still engage the catches 194 in the outer race 157 and the fins 184 of the inner race 164. Thus, clutch mechanism 160 may be advantageously operated with the axis of rotation A approaching a horizontal orientation.

Furthermore, while the embodiment of clutch mechanism 160 is portrayed in FIGS. 7 and 8 with the inner race 164 on top and the outer race 157 on bottom, it is also possible to arrange the races with the opposite configuration by inverting the shape of surfaces 182 and 187. In this alternative embodiment, surfaces 182 and 187 should still have a profile that is higher in center, near axis A. Further, in either embodiment of clutch mechanism 160, surfaces 182, 187 may have a variety of shapes in addition to the cone shape shown in FIGS. 7 and 8. These surfaces 182, 187 may be ramped, curved, domed or some other shape that tends to direct a bearing 80 radially towards the catches 194 in the outer race 157.

The embodiments of the present invention may be carried out in other specific ways than those herein set forth without departing from the scope and essential characteristics of the invention. For instance, the embodiments described have been depicted in use with a pick mechanism 16 adapted to pull individual sheets from a media stack. The clutch mechanism 60 may also be used in other parts of a sheet conveying system, including for example, a duplex paper path or an output stack. The Figures illustrate a single bearing used within the clutch mechanism. However, a plurality of bearings may be used in the mechanism depending upon the specific parameters. The clutch mechanism 60 may be incorporated in a variety of image forming devices including, for example, printers, fax machines, copiers, and multifunctional machines including vertical and horizontal architectures as are known in the art of electrophotographic reproduction. The present embodiments are, therefore, to be considered in all respects as illustrative and not restrictive, and all changes coming within the meaning and equivalency range of the appended claims are intended to be embraced therein.

What is claimed is:

1. A device to move media in an image forming apparatus comprising:
  a first race having an interior wall forming a recess, the interior wall having a plurality of indentations spaced around the interior wall, each of the indentations having a ramped section leading into a catch;
  a second race having a plurality of fins, each of the fins spaced away from an open central section of the second race, each of the fins having an outer end oriented away from the open central section, the second race being rotatably mounted relative to the first race with the outer ends being closer to the ramped sections than the catches during rotation; and
  a bearing positioned between the first and second races, the bearing sized to simultaneously contact one of the catches and one of the fins to transmit a rotational torque from the second race to the first race.

2. The device of claim 1 wherein the recess is centrally positioned in the first race.

3. The device of claim 1 wherein the second race is mounted within the first race.

4. The device of claim 1 wherein the bearing is cylindrical.

5. The device of claim 1 wherein the open central section is larger than the bearing to allow the bearing to pass from an upper section to a lower section.

6. The device of claim 1 wherein the plurality of fins and the interior wall extend outwardly from a ramped surface that slopes downward from a high point near the open central section to a low point adjacent the interior wall.

7. The device of claim 1 wherein the plurality of fins and interior wall extend outwardly from a substantially flat surface that is substantially perpendicular to a central axis of rotation.

8. The device of claim 1, wherein the plurality of indentations are evenly spaced around the interior wall, and the plurality of fins are evenly spaced around the open central section.

9. A device to move media in an image forming apparatus comprising:
  a center point;
  a wall spaced from and facing the center point, the wall having a plurality of indentations each having an outwardly ramped section and a catch, a first distance between the center point and catch being greater than a second distance between the center point and ramped section;

a plurality of fins, each having an inner edge spaced a third distance away from the center point and an outer edge spaced a fourth distance away from the center, the fourth distance being greater than the third distance and less than the second distance;

a bearing having a width greater than a difference between the first distance and the fourth distance; and an open central section that extends inward from the inner edge of the plurality of fins to allow the bearing to move under the influence of gravity.

10. The device of claim 9 wherein the bearing has a width smaller than the third distance.

11. The device of claim 9 wherein the bearing is a sphere having a substantially constant diameter.

12. The device of claim 9 wherein the bearing is a cylinder having a length and a substantially constant diameter, the width of the cylinder being the diameter of the cylinder.

13. The device of claim 9 wherein the plurality of fins and the plurality of catches each have a bearing contact surface with a shape that substantially matches an outer shape of the bearing.

14. A device to move media in an image forming apparatus comprising:

an independently rotatable first race;

an independently rotatable second race;

an open central section having an upper section and a lower section; and a bearing movable between an engaged position in simultaneous contact with the first and second races to transmit a rotational torque from the first race to the second race and a second disengaged position moving within the open central section from the upper section to the lower; and the upper section and the lower section are disposed vertically relative to one another such that as the bearing moves through the open central section from the upper section to the lower section, the bearing falls from the upper section to the lower section under the influence of gravity.

15. The device of claim 14 wherein the first race comprises a plurality of spaced-apart fins disposed around the open central section.

16. The device of claim 15 wherein the bearing is in contact with one of the plurality of fins when the bearing is in the engaged position.

17. The device of claim 15 wherein the space between adjacent fins is larger than a width of the bearing.

18. The device of claim 17 wherein the bearing is moveable between adjacent fins when the bearing is in the disengaged position.

19. The device of claim 14 wherein the upper section and the lower section are disposed radially relative to one another such that as the bearing moves through the open central section from the upper section to the lower section, the bearing falls from an inner point to an outer point under the influence of gravity.

20. The device of claim 14 wherein the bearing is cylindrical.

21. A device to move media in an image forming apparatus comprising:

a first race having an interior wall forming a recess, the interior wall having a plurality of catches spaced around the interior wall, the first race being rotatable;

a second race having a plurality of fins, each fin spaced away from a central section of the second race, the second race being rotatably mounted relative to the first race with the fins being disposed inside of the catches during rotation; and a cylindrical bearing positioned between the first race and the second race, the bearing being moveable between an engaged position where the bearing simultaneously contacts a fin and a catch to prevent independent rotation of the first race relative to the second race and a second disengaged position that allows for independent rotation of the first race relative to the second race;

in the second disengaged position, the bearing moves under the influence of gravity through the open central section from an upper portion of the open central section through a lower portion of the open central section.

22. The device of claim 21 wherein in the second disengaged position, the bearing moves to a position between adjacent ones of the plurality of fins and in contact with the interior wall.

23. The device of claim 21 wherein the first and second races are rotatable about a substantially non-vertical axis of rotation.

* * * * *